United States Patent [19]
Abe

[11] Patent Number: 5,892,622
[45] Date of Patent: Apr. 6, 1999

[54] AUTOMATIC FOCUSING METHOD AND APPARATUS

[75] Inventor: Yuko Abe, Miyagi, Japan

[73] Assignee: Sony Corporation, Tokyo, Japan

[21] Appl. No.: 982,540

[22] Filed: Dec. 2, 1997

[30] Foreign Application Priority Data

Dec. 2, 1996 [JP] Japan .................................. 8-321994

[51] Int. Cl.⁶ ..................... G02B 27/10; G11B 43/90
[52] U.S. Cl. .................................. 359/618; 369/54
[58] Field of Search .................... 359/618, 629; 369/13, 44.23, 44.35, 54, 110, 111, 112

[56] References Cited

U.S. PATENT DOCUMENTS

| | | | |
|---|---|---|---|
| 5,195,081 | 3/1993 | Usui | 369/112 |
| 5,225,886 | 7/1993 | Koizumi et al. | 356/237 |
| 5,721,605 | 2/1998 | Mizutani | 355/53 |
| 5,726,757 | 3/1998 | Kato et al. | 356/399 |

*Primary Examiner*—Georgia Epps
*Assistant Examiner*—Ricky Mack
*Attorney, Agent, or Firm*—Jay H. Maioli

[57] ABSTRACT

An automatic focussing method and an automatic focussing device capable of performing correct focussing. The relative position between an object 4 and an objective lens 2 is measured for focussing. The laser light illuminated on the object is transmitted through a cylindrical lens 7 so as to be condensed only as to one direction. The laser light condensed as to the one direction is illuminated via the objective lens 2 on the object 4 in a linear form. The illuminated laser light reflected by the object 4 is integrated and detected by a detection unit. The relative position between the object and the objective lens is measured from the spot of the detected reflected laser light in order to perform focussing.

8 Claims, 5 Drawing Sheets

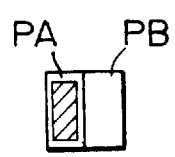 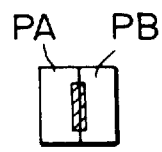 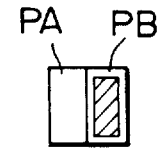
FIG.5A   FIG.5B   FIG.5C
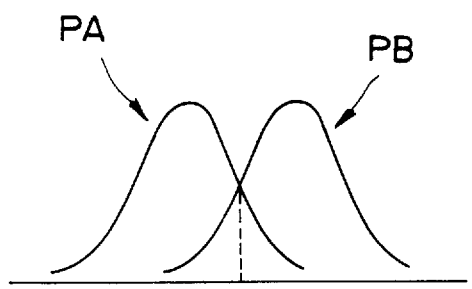
FIG.6A
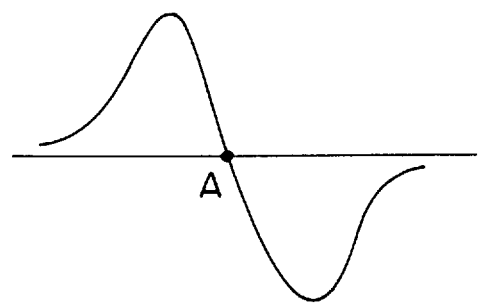
FIG.6B

AUTOMATIC FOCUSING METHOD AND APPARATUS

BACKGROUND OF THE INVENTION

1. Field of the Invention

This invention relates to a method and apparatus for automatic focussing that measures the distance between an object and an objective lens for carrying out focussing based on the measured value.

2. Description of Related Art

In the field of optical instruments, such as optical microscopes or depth meters, an automatic focussing device has hitherto been used for automatic focussing of an object being observed.

Among the automatic focussing devices, there are those in which a laser light beam is emitted to an object and the laser light beam reflected by the object is detected for measuring the distance from the object in order to effect automatic focussing. This automatic focussing device includes a photodetector, such as a photodiode, and detects the reflected laser light from this photodetector.

If the automatic focussing device is used for an optical microscope, the laser light is emitted from a light source so as to be illuminated via an objective lens on the object. The laser light illuminated via the objective lens is reflected by the object so as to be again illuminated on the photodetector via the objective lens.

The reflected laser light forms a spot on the photodetector in association with the distance between the object and the objective lens. With the optical microscope having the automatic focussing device loaded thereon, the objective lens is moved for forming a spot of the reflected laser light beam at a pre-set position on the photodetector. This achieves focussing on the optical microscope.

Meanwhile, the above-described automatic focussing device has been developed for an optical pickup used for, for example, an optical disc. In such automatic focussing device, the laser light beam whose light spot can be reduced to a circular spot is radiated from the light source.

In such case, attempts have been made for reducing the diameter of the laser light spot in the automatic focussing device to as small a value as possible. In this manner, the automatic focussing device achieves fine focussing for an optical instrument, such as an optical pickup.

With these automatic focussing device, used for an optical instrument, such as an optical microscope, focussing needs to be achieved for an object presenting significant differences between bright and dark portions or having a non-smooth surface state. If the surface state of the object is poor, and a laser light beam having a circular light spot of a small diameter is used by the automatic focussing device, the reflected laser light is disturbed. Thus, with the automatic focussing device, the reflected laser light cannot be detected optimally by the photodetector, thus disabling focussing.

On the other hand, if the automatic focussing device is used for an optical instrument, such as an optical microscope, focussing needs to be realized for a field of view larger than the spot diameter of the laser light beam. However, since the laser light beam having a small spot diameter is illuminated on the object, focussing is only for a point in the field of view of the optical microscope illuminated by the laser light. If focussing is only for a point in the field of view of the optical microscope, there is an inconvenience that focussing cannot be realized for other portions.

For obviating this problem, it has been proposed to scan the circular spot of a reduced diameter across the entire field of view and measured values obtained for respective points on the scanning line are averaged to give a mean value which is used for realizing the focussing. However, if this method is used, it becomes necessary to provide a mechanism for scanning the laser light beam thus complicating the structure and consuming time for focussing.

SUMMARY OF THE INVENTION

It is therefore an object of the present invention to provide an automatic focussing method and apparatus wherein a laser light beam is illuminated on an object without scanning for realizing correct focussing.

The present invention provides an automatic focussing method for measuring the relative position between an object and an objective lens for realizing focussing, including the steps of transmitting a laser light beam illuminated on the object through a cylindrical lens and condensing the laser light beam only as to one direction, radiating the laser light beam, via an objective lens on the object in a linear-shaped form, integrating and detecting the linear-shaped reflected laser light beam produced by reflection of the radiated laser light beam on the object, and measuring the relative position between the object and the objective lens from the spot of the detected reflected laser light beam for performing the focussing.

This automatic focussing method may also be configured so that, after the one direction of the laser light is condensed, at least a portion thereof is shielded by a shielding plate having a mirror surface for illumination on the object, the laser light not shielded by the shielding plate is reflected by the object and illuminated on the mirror surface of the shielding plate and the reflected laser light illuminated on the shielding plate is reflected by the mirror surface so as to fall on the detection means.

With the automatic focussing method of the present invention, the laser light is turned by a cylindrical lens arranged on the optical path of the laser light into a linear-shaped spot which is illuminated on the object. With this technique, the reflected laser light, which is the reflected laser light illuminated as the linearshaped spot, is detected. Subsequently, the distance between the object and the objective lens is measured from the detected reflected laser light for realizing the focussing.

Thus, with this technique, the reflected laser light is illuminated on the photodetector in a non-disturbed state even if the object presents a significant difference between bright and dark portions or if the surface of the object is not smooth. Therefore, this technique is useful if it is desired to realize focussing over a wide area in an optical instrument, such as optical microscope.

The present invention also provides an automatic focussing device for measuring the relative position between an object and an objective lens for realizing focussing, including a light source for radiating the laser light on the object, a cylindrical lens arranged on the optical axis of the laser light radiated from the light source for condensing the laser light only in one direction and detection means for integrating and detecting a linear-shaped reflected laser light beam, obtained on reflecting the laser light radiated in a linear form on the object via the cylindrical lens. The detection means measures the relative position between the object and the objective lens by a light spot formed by the reflected laser light for performing the focussing.

With the present automatic focussing device according to the present invention, since the cylindrical lens is arranged on the optical path of the laser light radiated from the light source, a linear-shaped laser light beam is illuminated on the object. This automatic focussing device achieves focussing using the reflected laser light of the linear-shaped laser light beam. Therefore, with the present automatic focussing device, the distance between the object and the objective lens can be measured to effect correct focussing even if the object presents a significant difference between bright and dark portions or if the surface of the object is not smooth.

With the automatic focussing method and the automatic focussing device according to the present invention, the linear-shaped laser light spot is used for measuring the relative position between the object and the objective lens. Thus, with the present invention, the relative position between the object and the objective lens can be measured without the illuminated laser light being affected by the surface state of the object. Therefore, with the automatic focussing method and the automatic focussing device according to the present invention, focussing can be realized accurately over a wide area in a short time.

BRIEF DESCRIPTION OF THE DRAWINGS

FIGS. 4a to 4c show a light path for illustrating a spot of a reflected laser light beam formed on a two-segment detector, wherein FIG. 4a shows a case wherein the objective lens and the object are separated a distance longer than the focal length, FIG. 4b shows a case wherein the objective lens and the object are separated a distance equal to the focal length and FIG. 4c shows a case wherein the objective lens and the object are separated a distance smaller than the focal length.

FIGS. 5a to 5c are plan views for illustrating a spot of a reflected laser light beam formed on a two-segment detector, wherein FIG. 5a shows a case wherein the objective lens and the object are separated a distance longer than the focal length, FIG. 5b shows a case wherein the objective lens and the object are separated a distance equal to the focal length and FIG. 5c shows a case wherein the objective lens and the object are separated a distance smaller than the focal length.

FIG. 6a is a graph showing the volume of light of the reflected laser light illuminated on a photodiode PA and a photodiode PB, and FIG. 6b is a graph showing a focussing error signal obtained on subtracting the light volume of the photodiode PB from the light volume of the photodiode PA.

DESCRIPTION OF PREFERRED EMBODIMENTS

Figure 1:
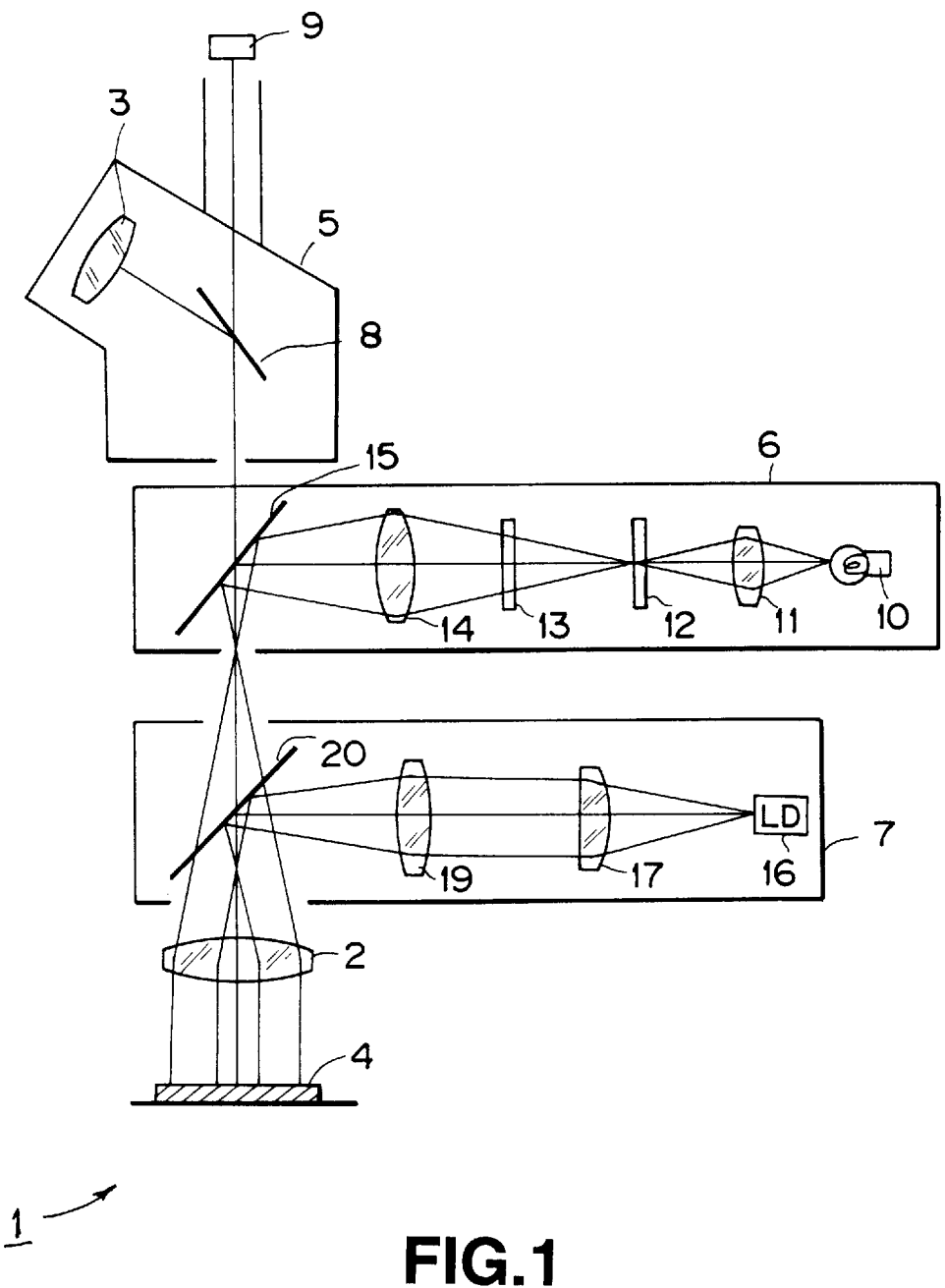
FIG. 1 is a schematic view showing an optical microscope employing an automatic focussing device according to the present invention and particularly showing a laser light beam in the automatic focussing device from one lateral side.

Referring to the drawings, preferred embodiments of the present invention will be explained in detail.

In a first embodiment of the present invention, the automatic focussing method and the automatic focussing device are applied to an optical microscope 1 shown in FIG. 1. The automatic focussing method and the automatic focussing device according to the present invention may, however, be applied to other optical instruments, such as a depth meter, without being limited to the optical microscope.

In the illustrated embodiment, the optical microscope 1 includes a lens barrel unit 5, having an objective lens 2 and an eye-piece 3 and arranged for facing an object 4 being observed, an illuminating unit 6 for radiating an illuminating light beam to the object 4 and an automatic focussing device 7 for measuring the separation between the objective lens 2 and the object 4 for focussing.

In the present optical microscope 1, the lens barrel unit 5 includes the objective lens 2 mounted facing the object 4 being observed, the eye-piece 3 arranged on the optical axis of the light transmitted through the objective lens 2, and a mirror 8 arranged between the objective lens 2 and the eye-piece 3. The lens barrel unit 5 also includes a CCD 9 arranged on the optical axis of the light transmitted through the mirror 8 for detecting and imaging the transmitted light.

In the present optical microscope 1, the illuminating unit 6 includes an illuminating light source 10 for radiating the illuminating light, a first lens 11, a diaphragm 12, a filter 13, a second lens 14 and an illuminating mirror 15 in this order on the same optical axis.

Figure 2:
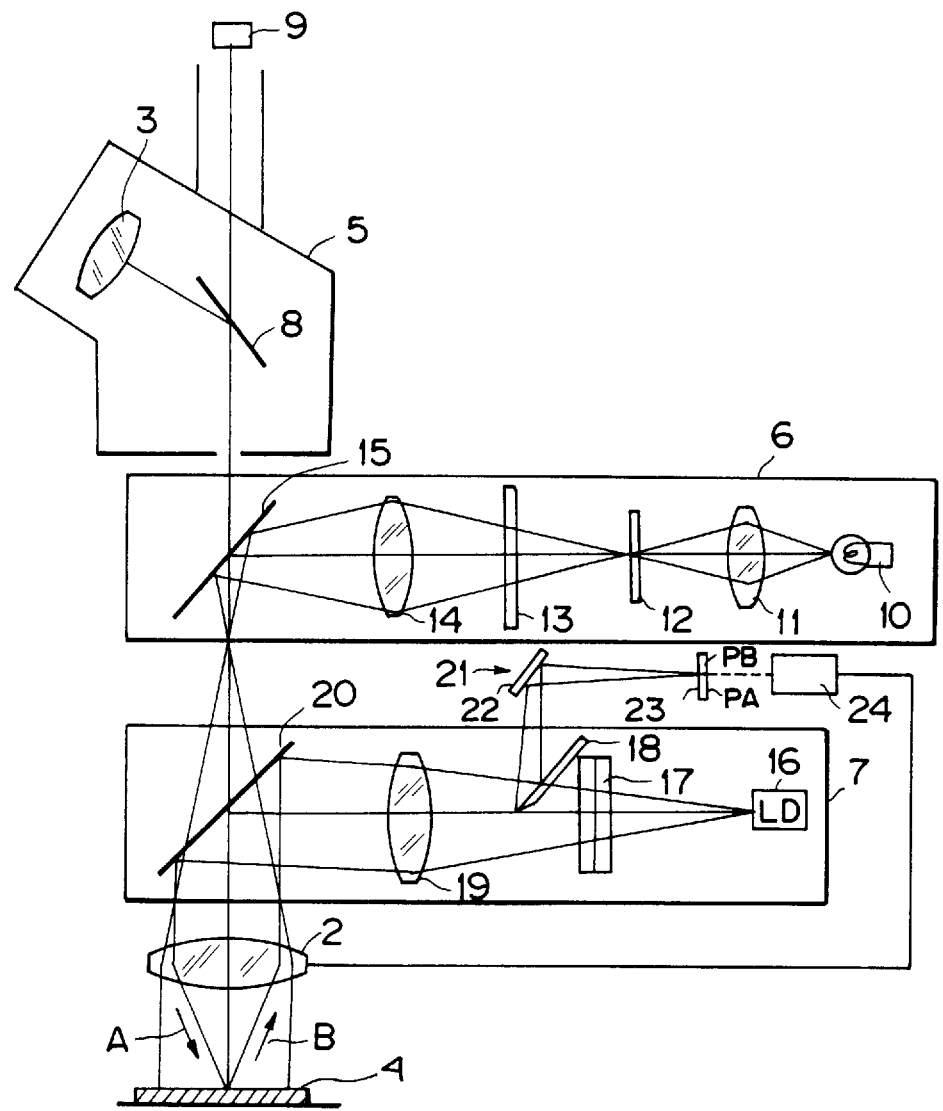
FIG. 2 is a schematic view showing an optical microscope employing an automatic focussing device according to the present invention and particularly showing a laser light beam in the automatic focussing device from a direction perpendicular to the lateral side shown in FIG. 1.

In this optical microscope 1, the automatic focussing device 7 includes a light source 16, comprised of a laser diode for radiating a laser light beam, a cylindrical lens 17 arranged on the optical axis of the laser light beam radiated from the light source 16, a knife edge 18 for shielding at least part of the laser light transmitted through the cylindrical lens 17, a lens 19 for condensing the laser light shielded by the knife edge 18 and a mirror 20 for reflecting the laser light for transmitting the laser light condensed by the lens 19 through the objective lens 2, as shown in FIGS. 1 and 2. The automatic focussing device 7 also includes a photodetector 21 for detecting the reflected laser light from the object 4.

The photodetector receiving antenna unit 21 includes the above-mentioned knife edge 18, a mirror for the reflected laser light 22 for reflecting the laser light reflected by the knife edge 18, a two-segment detector 23 for detecting the spot of the laser light reflected by the mirror for the reflected laser light 22.

With the above-described optical microscope 1 according to the illustrated embodiment, the objective lens 2 is moved by the automatic focussing device 7 in a direction towards and away from the object 4 for focussing.

The automatic focussing device 7 radiates the laser light on the object 4 at the time of focussing. The automatic focussing device 7 detects, by the photodetector 21, the illuminating laser light reflected from the object 4, for measuring the relative position between the object 4 and the objective lens 2.

In the automatic focussing device 7, the pre-set laser light is radiated from the light source 16 to fall on the cylindrical lens 17. The laser light incident on the cylindrical lens 17 has its one direction collimated, while having its other direction passed directly through the lens, thus presenting a substantially elliptically-shaped light spot. The laser light beam transmitted through the cylindrical lens 17 is shielded at substantially a mid position along the long axis by the knife edge 18 before being incident on the lens 19.

When the laser light is incident on the lens 19, the long-axis direction of the substantially elliptically-shaped light spot is collimated, while its short axis direction is condensed. The laser light is then reflected by the mirror 20 and enters the lens barrel unit 5 to fall on the objective lens 2. The laser light is further condensed by the objective lens 2 before being illuminated on the object 4.

Figure 3:
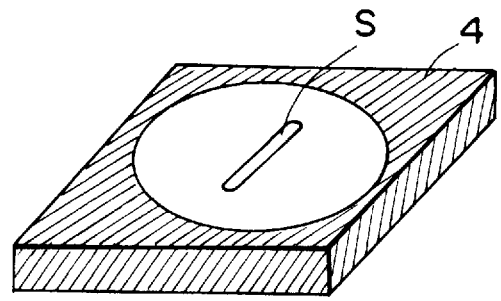
FIG. 3 is a schematic view showing a laser light spot used in the automatic focussing device of the present invention.

Since the laser light radiated from the light source is transmitted through the optical system having the cylindrical lens 17 as described above, a linear-shaped light spot S as shown in FIG. 3 is formed on the object 4, if the objective lens 2 is focussed relative to the object 4.

The laser light illuminated on the object 4 is reflected therefrom. This reflected laser light is illuminated via objective lens 2, mirror 20 and lens 19 on the knife edge 18 to fall on the photodetector 21. The reflected laser light illuminated on the knife edge 18 is reflected thereby to be illuminated on the mirror for reflected laser light 22. The reflected laser light is reflected by the mirror for reflected laser light 22 so as to be illuminated on the two-segment detector 23. The reflected laser light forms a spot on the two-segment detector 23.

That is, with the present optical microscope 1, the laser light is illuminated by the automatic focussing device 7 in a direction indicated by arrow A in FIG. 2, for illuminating the reflected laser light in the direction indicated by arrow B in FIG. 2.

The two-segment detector 23 is made up of two photodiodes PA, PB for detecting the reflected laser light illuminated thereon.

Figure 4A:
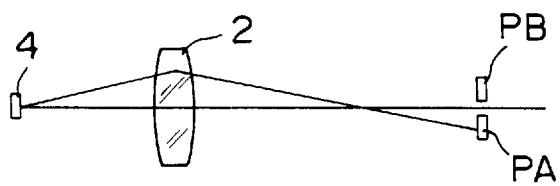

Specifically, if the object 4 and the objective lens 2 are positioned at a separation larger than the focal length of the objective lens 2, as shown in FIG. 4a, the laser light is illuminated on the two-segment detector 23 in a non-focussed state. In this case, a broad light spot is formed only on the photodiode PA, as shown in FIG. 5a.

Figure 4B:
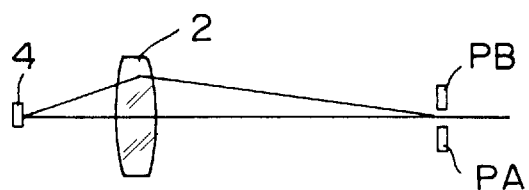

If the object 4 and the objective lens 2 are positioned at a separation equal to the focal length of the objective lens 2, as shown in FIG. 4b, the laser light is illuminated on the two-segment detector 23 in a focussed state. In this case, a sole linear-shaped spot is formed so as to lie astride both the photodetectors PA and PB, as shown in FIG. 5b.

Figure 4C:
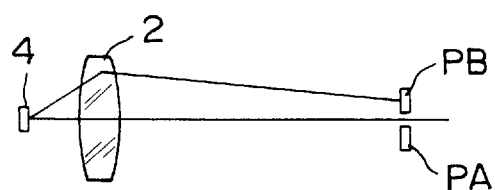

If the object 4 and the objective lens 2 are positioned at a separation smaller than the focal length of the objective lens 2, as shown in FIG. 4c, the laser light is illuminated on the two-segment detector 23 in a non-focussed state. In this case, a broad light spot is formed only on the photodiode PB, as shown in FIG. 5c.

With the present automatic focussing device 7, as described above, the light spot of the reflected laser light formed on the two-segment detector 23 becomes different due to the relative position between the object 4 and the objective lens 2. The automatic focussing device 7 detects the spot on the two-segment detector 23 for measuring the relative position between the object and the objective lens 2. Based on the measured value, the automatic focussing device 7 drives the objective lens 2 in a direction away from or toward the object 4 for focussing.

Specifically, the two-segment detector 23 detects the light volume incident on the photodiodes PA and PB, as shown in FIG. 6a. The two-segment detector 23 takes a difference between the signal of the photodiode PB and that of the photodiode PA, with the aid of the controller 24, as shown in FIG. 6b. In this manner, the controller 24 drives the objective lens 2 based on the so-called focussing error signals obtained as a S-shaped curve.

The present automatic focussing device 7 drives the objective lens so that the objective lens 2 and the object 4 are in the focussed state as shown in FIG. 4b and so that the light spot will be formed on the photodiodes PA and PB, as shown in FIG. 5b. That is, the present automatic focussing device 7 drives the objective lens 2 so that the focussing error signals at the controller 24 will represent a point shown at A in FIG. 6b.

With the optical microscope 1, thus focussed by the automatic focussing device 7, the illuminating light is radiated by the illuminating unit 6 on the object 4. This light is used for forming an image of the object 4 with the aid of the lens barrel unit 5.

The illuminating unit 6 radiates the light of a pre-set volume from the illuminating light source 10. This illuminating light is condensed by the first lens 1 1 so as to fall on the second lens 14 via diaphragm 12 and filter 13. The illuminating light incident on the second lens 14 is reduced to a desired spot diameter and reflected by the illuminating mirror 15 to enter the lens barrel unit 5 to fall on the objective lens 2. The illuminating light is collimated by the objective lens 2 so as to be illuminated with a desired spot size on the object 4.

The optical microscope 1 uses the illuminating light, radiated as described above, for forming a image of the object 4, condensed by the objective lens 2, by the eye-piece 3 and the CCD 9. The optical microscope 1 measures the relative position between the object 4 and the objective lens 2, by the automatic focussing device 7 having the cylindrical lens 17 as described above, for achieving focussing.

That is, the automatic focussing device 7 realizes focussing by illuminating a linear-shaped laser light beam on the object 4. Thus, the laser light in its entirety is not disturbed even if the difference between brightness and darkness on the surface of the object 4 is significant or if the object 4 presents a non-uniform surface. Thus, with the use of the automatic focussing device 7, correct focussing can be realized without dependency on the surface state of the object 4.

Also, if, with the use of the automatic focussing device 7, focussing is to be realized for the entire field of view of the optical microscope 1, focussing can be realized in a shorter time, because the linear-shaped laser light is used for focussing. That is, with the present automatic focussing device 7, focussing can be realized using the linear-shaped laser light without the necessity of scanning the laser light over the entire field of view.

Moreover, if, with the optical microscope 1, the object 4 has two or more layers, a layer to be irradiated with the laser light can be specified by affording an offset to the controller 24. That is, with the present optical microscope 1, focussing can be realized only on the object 4 at a desired height.

Meanwhile, the optical microscope of the illustrated embodiment is not limited to a construction in which the illuminating unit 6 has an optical path different from that of the automatic focussing device 7. Conversely, the optical microscope 1 may also be an integrated type optical microscope 30, as shown in FIG. 7 in which the illuminating unit 6 has the same optical path as that of the focussing device 7.

In the following description of the integrated type optical microscope 30 shown in FIG. 7, parts or components corresponding to those of the above-described optical microscope 1 are denoted by the same reference numerals and the description of the structure and the operation is omitted for simplicity.

Figure 7:
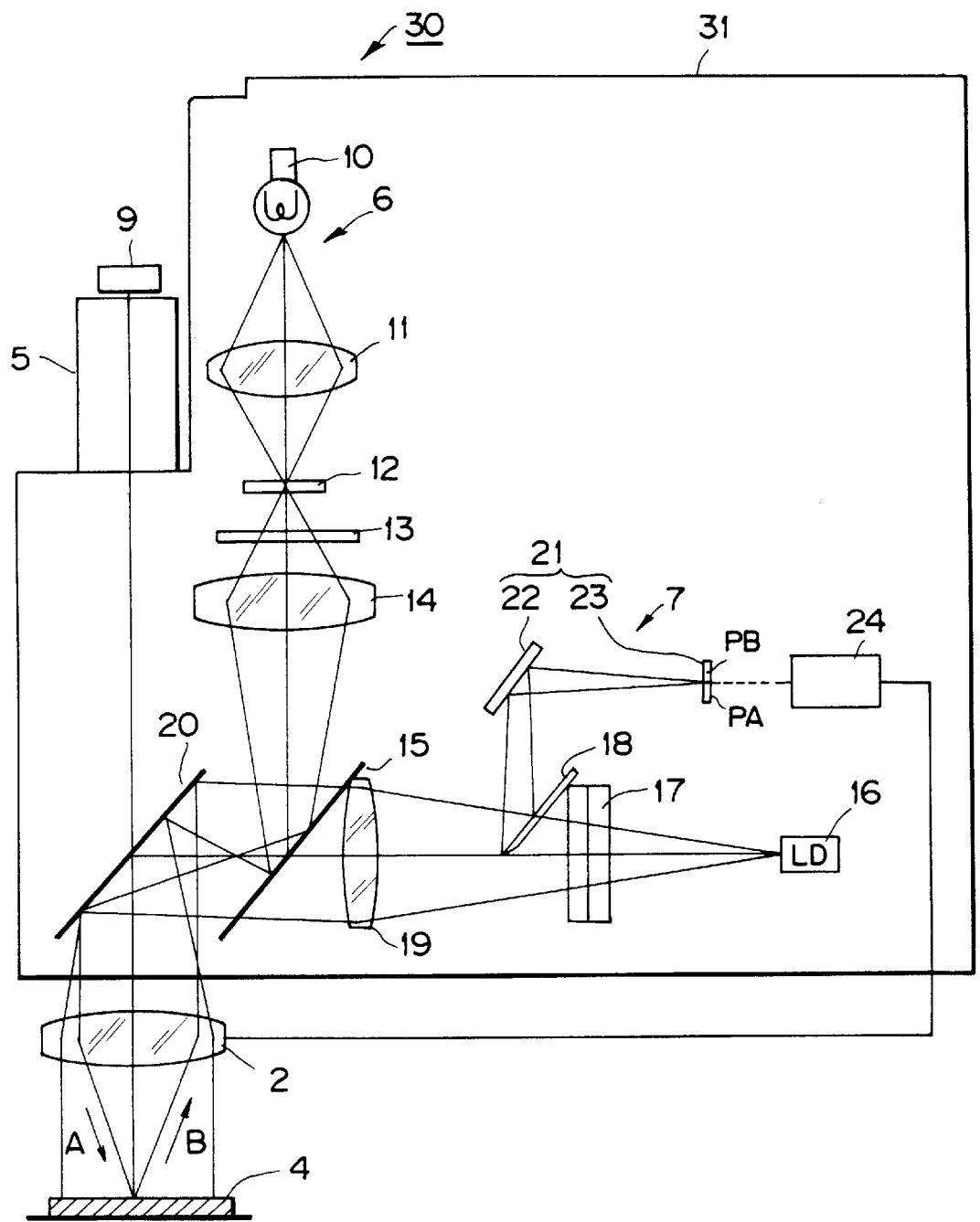
FIG. 7 is a schematic view showing an integrated type optical microscope according to another embodiment of the present invention.

The integrated type optical microscope 30, shown in FIG. 7, is roughly comprised of an integrated type device 31, including a lens barrel unit 5 having an objective lens 2 and a CCD 9 and arranged facing an object 4, an illuminating unit 6 for radiating an illuminating light and an automatic focussing device 7 for radiating a focussing laser light beam.

This integrated type device 31 has such a structure in which an illuminating mirror 15 of the illuminating unit 6 is arranged between the mirror 20 and the lens 19 constituting the automatic focussing device 7. With the integrated type optical microscope 30, constructed as described above, the optical axis of the illuminating light radiated from the illuminating light source 10 of the integrated type device 31 and the optical axis of the laser light of the automatic focussing device 7 are superimposed together as the illuminating light and the laser light enter the lens barrel unit 5. The illuminating light and the laser light fall on the objective lens 2 in the lens barrel unit 5 so as to be radiated on the object 4.

With the above-described integrated type optical microscope 30, focussing between the object 4 and the objective lens 2 can be realized as accurately as with the above-described optical microscope 1. Also, since the illuminating unit 6 and the automatic focussing device 7 are formed as a sole integral unit in the present integrated type optical microscope 30, the microscope can be reduced in size.

The automatic focussing method and the automatic focussing device according to the present invention are not limited to the optical microscopes 1, 30. The present invention can, of course, be applied to an optional optical instrument having an optical system and which is in need of focussing.

With the above-described embodiments, a so-called knife edge method is used, in which a shielding plate in the form of a knife edge is used as detection means for detecting the reflected laser light. However, the automatic focussing method and the automatic focussing device according to the present invention are not limited to the above-described detection means for detecting the reflected laser light such that a Foucault method or a critical angle method may also be used.

What is claimed is:

1. An automatic focussing method, for use with an automatic focussing device having an objective lens, a cylindrical lens, a shielding plate having a mirror surface, and detection means and for measuring a relative position between an object and the objective lens so as to realize focussing of the object, comprising the steps of:

transmitting a laser light beam illuminated on the object through the cylindrical lens and condensing the laser light beam only in one direction;

radiating the laser light beam, thus condensed only in the one direction, via the objective lens onto the object in a linear-shaped form;

integrating and detecting a linear-shaped reflected laser light beam, produced by reflection of the laser light beam radiated onto the object; and measuring the relative position between the object and the objective lens from a spot of the linear-shaped reflected laser light beam.

2. The automatic focussing method as claimed in claim 1, further comprising the steps of:

shielding at least a portion of the laser light beam condensed only in the one direction, with the shielding plate having the mirror surface for radiating partially shielded light onto the object;

reflecting the laser light beam not shielded by the shielding plate from the object so as to radiate a reflected laser light beam onto the mirror surface of the shielding plate; and further reflecting the reflected laser light beam radiated on the mirror surface of the shielding plate from the mirror surface of the shielding plate onto the detection means.

3. The automatic focussing method as claimed in claim 2, including the step of using a two-segment detector having two photodiodes as said detection means.

4. The automatic focussing method as claimed in claim 2, including the step of forming the shielding plate to include a laser light shielding end formed as a knife edge.

5. An automatic focussing device for measuring a relative position between an object and an objective lens so as to realize focussing of said object, comprising:

a light source for radiating laser light onto said object;

a cylindrical lens arranged on the optical axis of said laser light radiated from said light source for condensing said laser light only in one direction; and detection means for integrating and detecting a linear-shaped reflected laser light beam, obtained by reflecting said laser light radiated in a linear form on said object via said cylindrical lens, said detection means measuring said relative position between said object and said objective lens by measuring a light spot formed by said linear-shaped reflected laser light beam.

6. The automatic focussing device as claimed in claim 5, wherein said detection means includes a shielding plate having a mirror surface and adapted for shielding at least a portion of said laser light, said laser light being reflected on said object and said linear-shaped reflected laser light beam being radiated on said mirror surface of said shielding plate, said linear-shaped reflected laser light beam radiated on said mirror surface of said shielding plate being reflected by said mirror surface onto said detection means.

7. The automatic focussing device as claimed in claim 6, wherein said detection means comprises a two-segment detector formed by two photodiodes.

8. The automatic focussing device as claimed in claim 6, wherein said shielding plate includes an edge for shielding said laser light formed as a knife edge.

* * * * *